G. L. THOMPSON.
PROCESS OF MAKING SELF LUBRICATING JOURNALS.
APPLICATION FILED APR. 23, 1910. RENEWED OCT. 4, 1912.
1,059,954. Patented Apr. 22, 1913.
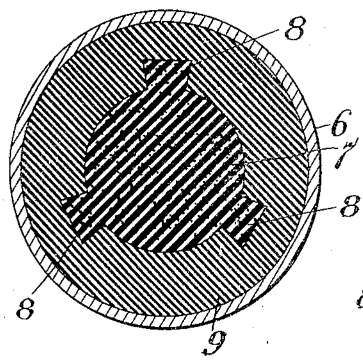
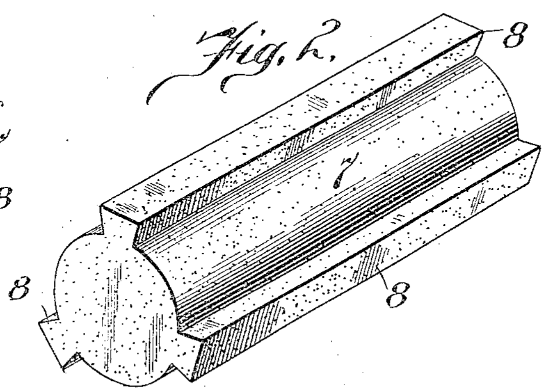
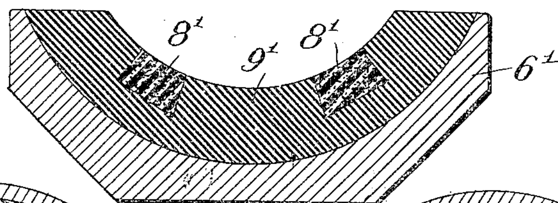
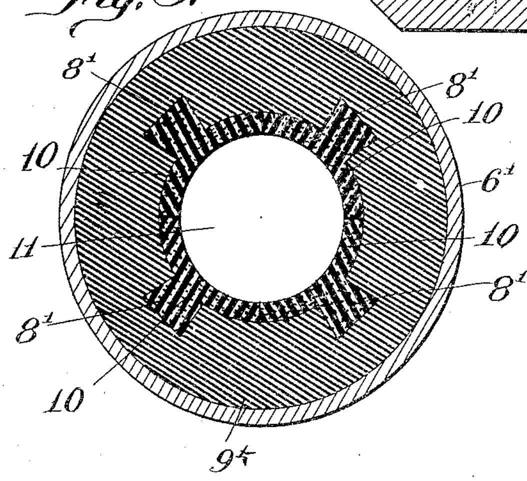
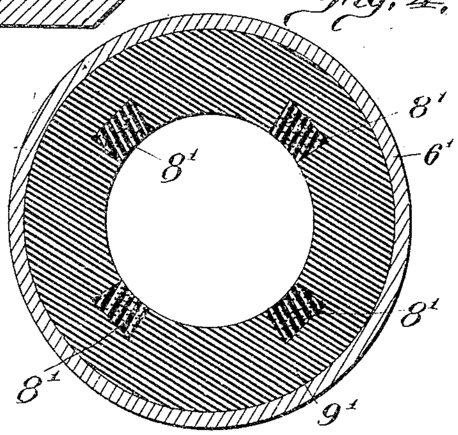
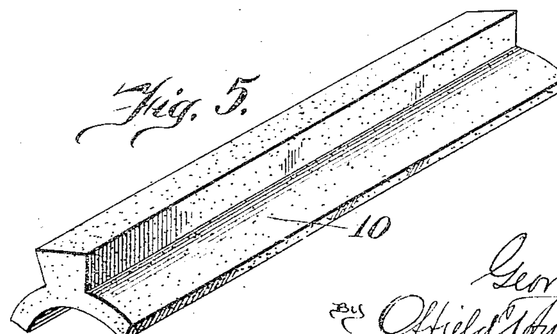
Witnesses
Milton Lenoir
Emilie Rose
Inventor,
George L. Thompson,
By Offield Towle Graves & Offield
Attorneys.

UNITED STATES PATENT OFFICE.

GEORGE L. THOMPSON, OF LOS ANGELES, CALIFORNIA.

PROCESS OF MAKING SELF-LUBRICATING JOURNALS.

1,059,954. Specification of Letters Patent. Patented Apr. 22, 1913.

Application filed April 23, 1910, Serial No. 557,140. Renewed October 4, 1912. Serial No. 724,000.

*To all whom it may concern:*

Be it known that I, GEORGE L. THOMPSON, a citizen of the United States, residing at Los Angeles, in the county of Los Angeles and State of California, have invented certain new and useful Improvements in Processes of Making Self-Lubricating Journals, of which the following is a specification.

This invention relates to a new and improved process of making self-lubricating journals and refers more specifically to the production of journal bearings having incorporated with one of the journal members one or more solid bodies of graphite.

Among the salient objects of the invention are to provide a new and improved process of making a journal bearing having one or more bars or bar-like insets of solid graphite formed and exposed flush with the main bearing surface of the member and extending transversely of the direction of rubbing movement of the bearing surfaces; to provide an improved process in which the preformed solid bar like insets form parts of the composite wearing surface of the member; to provide a method or process of manufacture which insures that the exposed surface of the graphite will be exactly flush, true and uniform with the remainder of the bearing surface of the member, and this without involving an expensive metal machining operation; to provide a process by which the graphite insets are so united with the remainder of the member as to remain fully effective and efficient during the whole life of the bearing; and in general to provide a simple and economical process of the character referred to.

The invention consists in the matters hereinafter described, and more particularly pointed out in the appended claims.

In the accompanying drawing Figure 1 is a cross-sectional view of a bushing-shell and core arranged axially therein in readiness for casting in the metal which forms the chief wearing part of the bearing; Fig. 2 is a perspective view of the core shown in position in Fig. 1; Fig. 3 is a view similar to Fig. 1 showing a modified construction; Fig. 4 is a cross-sectional view of the completed bearing of which parts are shown in Fig. 3; Fig. 5 is a perspective view of one of the core segments shown in Fig. 3. Fig. 6 is a cross sectional view of a divided box journal member.

Numerous journal bearings and journal bearing members have heretofore been invented having graphite inserted in cavities or inset in the journal member, for the purpose of forming a self-lubricating journal or bearing. These prior art devices may be grouped into two classes,—one in which the graphite is in the form of a semi-solid paste, and the other in which the graphite is in the form of tablets of solid material, which tablets are pre-formed, attached to some suitable support and then cast in so that they become inset, exposed at the wearing surface.

The devices of the first class afford no opportunity for positive wearing contact pressure between the graphite contained in the pockets or recesses and the opposed part which is to be lubricated. When a bearing of this type is first operated, *i. e.*, when freshly charged with the graphite, the lubrication is more or less efficient, but the opposed lubricated member soon empties the cavities or recesses to a slight depth and thereafter fresh supplies of lubricant are only drawn out and between the surfaces of the metal parts as the metal in which the graphite is inset is actually worn away and the cavities thereby made shallower. This is, of course, a serious defect and objection, since the lubrication does not continue fully efficient for any considerable length of time without renewal.

The bearings of the second class referred to have two principal defects or objections, viz: the tablet or discontinuous form of the insets produces a more or less uneven distribution of the graphite, and it has been found impracticable if not impossible to cast the tablets in in such manner that their exposed surfaces will be fully and uniformly flush with the bearing surface of the metal, unless the wearing face of the metal be machined off after being cast, which involves an expensive operation. Moreover, the support upon which these tablets are preliminarily mounted is an item of considerable cost, must be made to proper size for each different size of bearing and the operation of attaching the tablets to such support in itself involves a separate operation and considerable expense.

By my present invention I overcome the objections hereinbefore pointed out.

The invention as to both of its phases will be readily understood from the following description, reference being had to the accompanying drawings.

A salient feature or characteristic of my improved process resides in pre-forming the graphite in such manner that one or more bar-like insets and core portions are combined in a single piece around which the molten metal which forms the chief part of the bearing member is cast. Subsequently that part of the graphite which constitutes the core proper is cut away leaving the bar-like insets finished and in position.

In forming bushings or sleeve-like bearing members of comparatively small diameters, I prefer to make the graphite cores solid with the bar-like insets integrally connected therewith as radial extensions, but where the bearing member is to be relatively large, as, for example, such a box or journal member as is commonly used for car journals, I prefer to make the core in the form of one or more shell-like segments with which the insets proper are integrally formed. Describing, then, first the process and article as made in small sizes, and referring to Fig. 1, 6 designates a tubular metal jacket which ordinarily forms a permanent outer wall of the finished bearing sleeve or bushing. This tubular member 6 is cut to the proper length to form the desired bearing, and suitably arranged for casting molten metal therein. Conveniently the shell is stood upon one end, so that the metal may be poured into the open upper end. Within the shell 6 is axially arranged a pre-formed graphite core member 7 provided with one or more radial extensions 8 formed integrally therewith. These extensions 8 preferably extend the full length of the bushing shell, and are preferably slightly wedge-shaped in cross section with their smaller dimensions next to or connected with the core, so that when cast into the metal of the bushing the parts will be locked together by reason of their form. These graphite cores with their integral insets may be molded in a well-understood manner from graphite in plastic form and under pressure, after which they are dried; the cores being so made as to be of hard consistency and amply strong to act as cores around which the metal may be cast. Having arranged the core in proper axial position within the shell, I cast in molten metal 9 between the exterior of the cylindric part of the core and the shell, thus surrounding the three exposed sides of the extensions 8. After the metal has solidified, the bushing is transferred to a suitable machine and the core part of the graphite bored out. Of course, in order to minimize expense of manufacture, the body of the core 7 will be made of the same size, or substantially the same size as the journal for which the bushing is adapted, so that when the core has been bored out the bushing will fit the journal without necessarily enlarging the bore by dressing away the metal itself. Usually, however, the graphite core will be very slightly smaller than the size of the journal, so that the interior of the bushing can be machined out very slightly, thus producing a perfectly true and smooth bearing surface upon its interior. This boring out of the graphite core, and machining of the interior bushing, of course, dresses the exposed surfaces of the insets 8 exactly flush with the remainder of the bearing surface of the member.

Where the journal member is of larger size, I prefer to make the graphite cores hollow, so as to economize in the amount of graphite used in molding the core. Preferably the hollow core is made up of a plurality of segments, as indicated at 10 (Fig. 3); each segment being provided with an integral bar extension 8′ substantially like the corresponding extensions 8 shown in Figs. 1 and 2. A set of segments which together form a complete cylindric shell is arranged concentrically within an outer metal shell 6′, as in the previously described method, and the metal 9′ cast into the space around such core. The space 11 within the core is, of course, left unfilled in casting. After the metal has been cast into the bushing, the latter is bored or reamed out substantially as in the previously described construction; the only difference being that it is only necessary to bore out the shell-like core inset of a solid core. The finished journal member or bushing is shown in Fig. 4, and it is obvious that substantially the same construction will be produced whether the solid or hollow graphite core be used in forming it.

While I have herein shown in both examples journal bearing members which are complete cylindric bushings, it is, of course, obvious that substantially the same method of procedure can be followed in producing a half box or other segmental bearing member, such for example as that shown in Fig. 6.

No departure from the method is made when the outer shell or mold within which the wearing metal is cast is used only temporarily for this purpose and does not become a permanent part of the bearing member, and this is true whether forming complete cylindric bearings or segments only.

I claim as my invention:

1. The herein described method of making composite self-lubricating journal members, which consists in first forming a core member with one or more integral rib projections of graphite, next arranging said core member in proper relation to a mold and with its rib projections extending into the mold space, then casting molten metal within said mold space and around said rib projections, and finally, after the metal has solidified, removing the core portion proper, leaving the rib projections embedded in the metal and flush with the bearing surface thereof.

2. The herein described method of making composite self-lubricating journal members, which consists in first pre-forming a core of graphite provided with one or more integral radially projecting and longitudinally extending ribs, arranging said core axially with reference to an outer mold shell, then casting molten metal into the space between the core and mold shell and around the rib projections, and finally machining out the graphite core proper, leaving the graphite rib members in the form of bar-like inserts embedded within the cast metal and surfaced flush with the bearing surface of the metal.

GEORGE L. THOMPSON.

Witnesses:
CHAS. S. BROWN,
ALBERT H. GRAVES.